US005355738A

United States Patent [19]

Heinonen

[11] Patent Number: 5,355,738

[45] Date of Patent: Oct. 18, 1994

[54] POSITIVE-DISPLACEMENT PIPETTE

[75] Inventor: Mauno Heinonen, Vantaa, Finland

[73] Assignee: Labsystems OY, Helsinki, Finland

[21] Appl. No.: 818,386

[22] Filed: Jan. 9, 1992

[30] Foreign Application Priority Data

Jan. 7, 1991 [FI] Finland .................................. 910087

[51] Int. Cl.$^5$ .......................... B01L 3/02; G01N 1/14

[52] U.S. Cl. .............................. 73/864.13; 73/864.17; 73/864.18

[58] Field of Search ........... 73/864.16, 864.17, 864.18, 73/864.14, 864.13; 422/100

[56] References Cited

U.S. PATENT DOCUMENTS

| | | | |
|---|---|---|---|
| 3,244,009 | 4/1966 | Tietje et al. | 73/864.18 X |
| 3,757,585 | 9/1973 | Heller et al. | 73/864.18 |
| 3,830,108 | 8/1974 | Spong | 73/864.14 |
| 4,141,250 | 2/1979 | D'Autry | 73/864.18 X |
| 4,165,646 | 8/1979 | Shapiro | 73/864.18 X |
| 4,362,064 | 12/1982 | d'Autry | 73/864.14 X |
| 4,466,298 | 8/1984 | Tervamaki et al. | 73/864.18 |
| 4,474,071 | 10/1984 | d'Autry | 73/864.13 |
| 4,567,780 | 2/1986 | Opperlander et al. | 73/864.16 |
| 4,616,514 | 10/1986 | Magnussen, Jr. et al. | 73/864.16 X |
| 4,967,604 | 11/1990 | Arpagus et al. | 73/864.13 |

FOREIGN PATENT DOCUMENTS 1291142 3/1969 Fed. Rep. of Germany ... 73/864.18

*Primary Examiner*—Tom Noland
*Attorney, Agent, or Firm*—Hopgood, Calimafde, Kalil & Judlowe

[57] ABSTRACT

A positive-displacement pipette is provided comprising a longitudinally extending body portion having a bore passing therethrough, a hand grip portion disposed at one end of the body, and a tip portion coupled to and coaxially extending from the hand-grip portion. A cylinder is employed connected to and extending coaxially from the tip portion of the pipette, wherein the cylinder has a jet at its bottom end and a piston rod extending through the cylinder to the jet. A gripping arm in the form of a slidable sleeve is movably supported within the bore of the body and is adapted for gripping the piston rod by force applied to the slidable sleeve to thereby cause the sleeve to attach itself to the piston rod by friction. A device located on the hand grip portion of the body is provided for applying force to the slidable sleeve and hence to the piston rod extending through the cylinder to the jet.

9 Claims, 2 Drawing Sheets

POSITIVE-DISPLACEMENT PIPETTE

BACKGROUND OF THE INVENTION

The invention relates to the handling of liquid samples. To be precise the invention relates to a positive-displacement pipette.

Displacement pipettes, in which there are detachable jet holds and pistons to be found in them, are already known in the prior art. In the pipette body there is a connecting arm movable in a bore and in the bottom point of it there is a gripping device formed by strips. The strips open when the point of the connecting arm is pushed out from the bore, whereby they settle around the top end of the piston rod. When pulling the connecting arm back into the bore, the strips press against the piston rod thus pulling the piston up.

In the pipette, according to the present invention there is a body, a cylinder part provided with a piston, and a sleeve-like gripping arm for gripping the piston.

The advantage of the pipette according to the invention is above all its simple structure.

BRIEF DESCRIPTION OF THE DRAWINGS

One of the embodiments of the invention will be described in the following in more detail. In the drawings of the description.

DETAILS OF THE INVENTION

Figure 1:
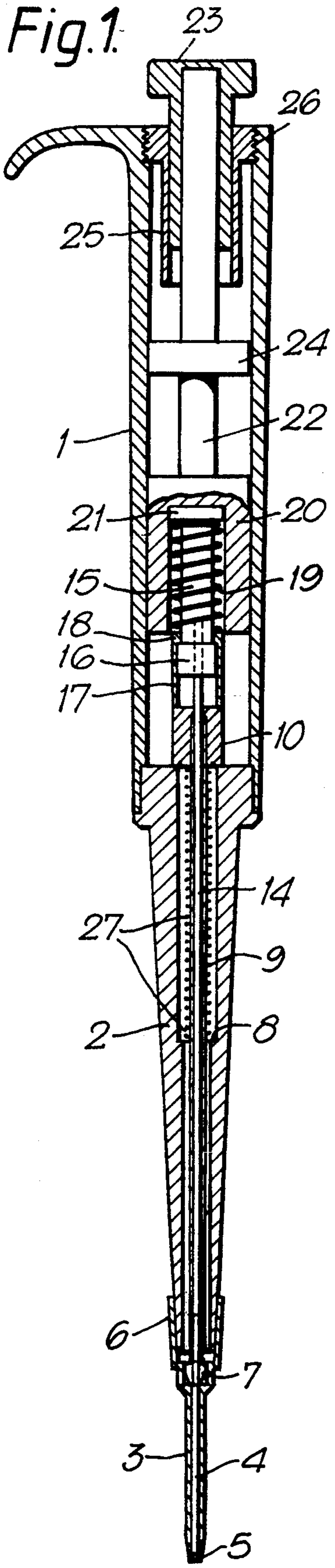
FIGS. 1–3 show a cross section of the pipette in its various functioning phases.
Figure 2:
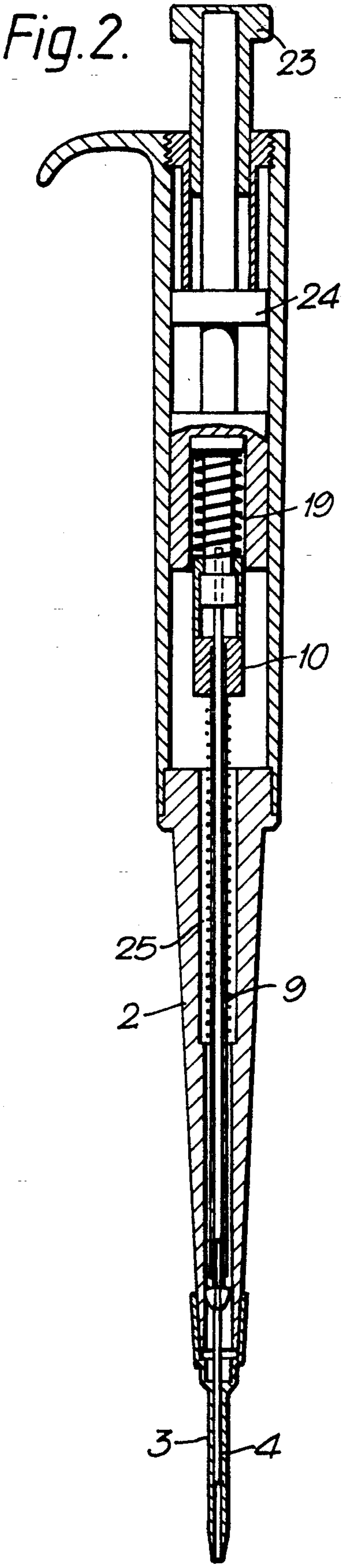
Figure 3:
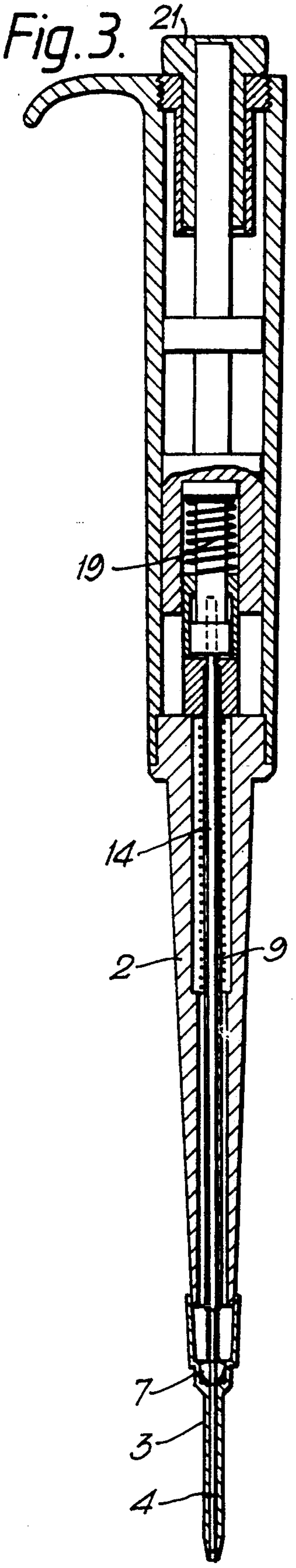

In the pipette according to FIGS. 1–3, there is a longitudinally extending body, which consists of a hand grip portion 1 and a tip part 2 extending coaxially therefrom. The tip part 2 narrows conically downwards. In its bottom end there is a jet attached by means of friction.

In the tip there is a cylinder part 3 and a piston 4. In the bottom end of the cylinder part 3 there is a cylinder, into which the piston 4 is sealed from its end by means of a sealing means 5. In the top end of the cylinder part 3 there is a cone-shaped expansion portion 6, the inner surface of which corresponds in shape to the outer surface of the end of the tip part 2 of the body. Thus the cylinder part 3 can be attached to the tip part 2 by friction. In the piston 4 there is a rod, which extends upwards over the bottom edge of the tip part 2 attached to the cylinder part 3. In the rod of the piston 4 there is attached a limiter 7, which is in the bottom of the expansion portion 6 when the piston is in its bottom position so, that the piston head is at the level of the bottom end of the cylinder.

In the tip part 2 there is a bore extending through it, which bore is larger in its top end so that in between there is formed a shoulder 8. In the bore, extending from its bottom end to the hand grip portion, there is a sliding sleeve 9. The top end of the sliding sleeve 9 is attached to a bottom limiting sleeve 10. The outside diameter of the bottom limiting sleeve 10 is larger than the top end diameter of the bore in the tip part 2.

Figure 4:
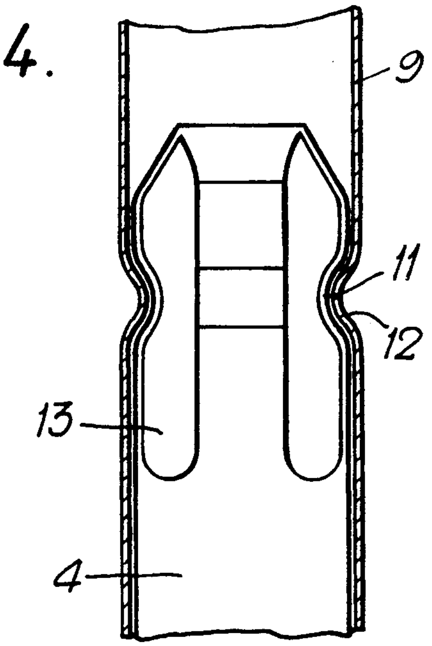
FIG. 4 shows piston mounting in enlarged scale.
Figure 5:
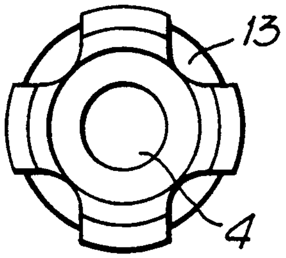
FIG. 5 shows the upper end of the piston from above.

When the tip part 2 is caused to slide into the expansion portion 6 of the cylinder part 3 in the tip, the sliding sleeve 9 is in its bottom position, the bottom end thereof being at the level of the bottom end of the tip part (FIG. 1), such that the sliding sleeve slides around the top end of the rod of the piston 4 and grips it by means of friction. The gripping is ensured by holding elements (FIG. 4), which are here formed by a circular throttle 11 made in the sleeve 9 and by a corresponding groove 5 12 in the rod of the piston 4. Sliding of the sleeve 9 over the rod is made easier by means of elastically deformable holding means or elements, which here consist of axial grooves 13 located in the end of the rod (FIGS. 4 and 5).

Inside of the slidable sleeve 9 there is a slidable releasing rod 14 (FIGS. 1 and 2), the upper end of which is attached into a sliding part 15 (FIG. 1). When the rod of the piston 4 is attached to the sliding sleeve 9, the bottom end of the releasing rod 14 is located over the top end of the rod of the piston 4. When the tip part is removed, the releasing rod 14 is caused to slide downwards whereby it thus pushes the rod of the piston 4 out from the sliding sleeve 9. At the same time the limiter 7 in the piston 4 presses against the bottom of the expansion 6 of the cylinder 3 and pushes the cylinder part apart from the tip part 2 (FIG. 3).

In the bottom end of the sliding part 15 there is a circular cantilever 16 supporting a holding sleeve 17 in the top end of which holding sleeve there is a limiting ring of annular shoulder 18 corresponding to the cantilever. The bottom end of the holding sleeve 17 extends beneath the bottom end of the sliding part 15 when the ring 18 of the holding sleeve is located against the cantilever 16. Around the sliding part 15 there is a coil spring 19, which presses the ring 18 in the holding sleeve 17 against the cantilever 16. From top the coil spring 19 is pressed by a collar 21 attached to the top end of the sliding part 15.

Over the sliding part 15 there is located a slidable bushing in the form of ring 20, in the downward embrasure of which the top end of the sliding part is located. Corresponding to the top surface of the slidable bushing ring 20 there is a press arm 22, in top end of which there is attached a broader press button 23 extending over the hand grip portion 1. Around the press arm 22 there is mounted by means of threads a limiting nut 24 sliding in the hand grip portion 1 in its longitudinal direction, twisting of which nut in regard to the hand grip portion is blocked by guide bars.

The top end of the hand grip portion 1 is closed by a calibration sleeve 25, which is attached in the hand grip portion by threads 26. The press button 23 is made in a manner that it slides in the calibration sleeve 25.

There is a coil spring 27 around the sliding sleeve 9, the bottom end of which coil spring is located against the shoulder 8 of the tip part 2. From the top part the spring 27 is pressed by the bottom limiting sleeve 10 attached to the top end of the sliding sleeve 9. The spring 19 is more rigid than the spring 27.

The spring 27 presses through the bottom limiting sleeve 10, holding sleeve 17, spring 19, collar 21, sliding part 15 and slidable bushing ring 20 the press arm 22 into its top position, in which the limiting nut 24 is located against the bottom surface of the calibration sleeve 25 (FIG. 2). Thus the upper limit of movement and suction volume of the sliding sleeve 9 and of the piston 4 attached to it are determined. The volume can be adjusted by turning the arm 22 by the button 23, whereby the location of the nut 24 in regard to the longitudinal direction of the arm is changed.

Also a desired volume indication is located in the hand grip 1 (not shown in FIGS. 1–3), e.g. indication based on turning digital rings. The volume indication is calibrated by turning the calibration sleeve 25 so, that the volume shown corresponds exactly to the suction volume in question.

Pipetting is started by pushing the tip part 2 in the cylinder part 3 and by pressing the button 23 against the force of the spring 27, until the bottom limiting sleeve 10 meets the upper surface of the jet part (FIG. 1), whereby the sliding sleeve 9 grips the piston 4. When the button 23 is pressed an increase in resistance is clearly felt in this phase. Also the force of the spring 19 starts to provide resistance to the pressing movement. The button 23 is held in this position and the jet of the cylinder 3 is brought into a vessel containing the liquid to be pipetted. Now the button 23 is released, whereby the spring 27 returns the sliding sleeve 9 into its top position and the piston 4 attached into the sleeve sucks up liquid into the cylinder 3. The liquid is removed from the cylinder 3 by pressing again the button 23 against the force of the spring 27, until the bottom limiting sleeve 10 meets the upper surface of the jet part 2. When the jet part is desired to be removed, the button 23 is pressed against the force of the spring 19 even lower. The releasing rod 14 pushes the piston 4 out of the sliding sleeve 9 and the limiter 7 presses the cylinder part 3 apart from the tip part 2 (FIG. 3).

The tip part according to FIGS. 1–3 is adapted for example, for pipettes of 2–25 microliters. For larger volumes a broader cylinder is needed in order to prevent the piston movement to become uncomfortably long.

Figure 6:
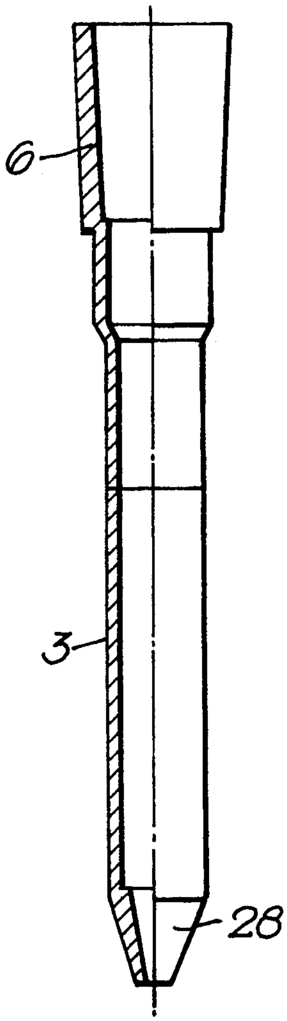
FIGS. 6 and 7 show another type of cylinder and piston in enlarged scale.
Figure 7:
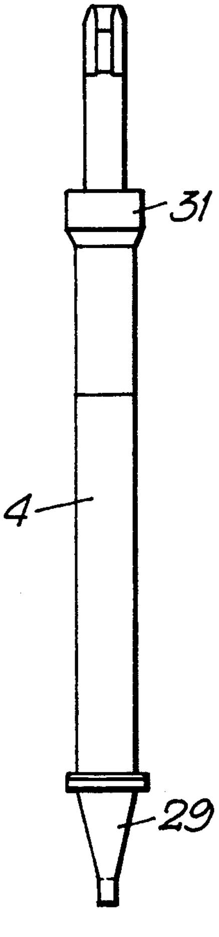

In FIGS. 6 and 7 there are shown a cylinder part 3 and a piston 4 of a tip part adopted for larger volumes, e.g. 20–250 microliters. The bottom end 28 of the cylinder part 3 is here conically narrowed. In the piston 4 there is in the bottom end a correspondingly shaped conical end part 29 and in its end a point 30 corresponding to the opening in the bottom end of the cylinder part. The sealing 5 of the piston 4 is directly over the end part 29. The end part 29 acts simultaneously as a limiter 7, which when pressing against the narrowed end 28 of the cylinder part 3 releases the expansion 6 from the jet part of the pipette. Additionally there is a guide ring 31 in the piston 4, which ring enables the piston to stay in the right direction.

In summary, a positive-displacement pipette is provided comprising a longitudinally extending body portion having a bore passing therethrough; a hand grip portion 1 disposed at one end of said body; a tip portion 2 coupled to and coaxially extending from the hand grip portion; and a cylinder 3 connected to and extending coaxially from said tip portion.

The cylinder 3 has a jet at its bottom end. A piston rod 4 extends through the cylinder to the jet, a gripping arm in the form of a slidable sleeve 9 being provided movably supported within the bore of the body and adapted for gripping the piston rod by force applied to the slidable sleeve to cause the sleeve to attach itself to the piston rod by friction. In addition, means are provided located on the hand grip portion of the body for applying force to the slidable sleeve and hence to the piston rod extending through the cylinder to said jet.

I claim:

1. A positive-displacement pipette comprising:
 a longitudinally extending body portion having a bore passing therethrough,
 a hand grip portion disposed at one end of said body,
 a tip portion coupled to and coaxially extending from said hand grip portion,
 a cylinder connected to and extending coaxially from said tip portion,
 said cylinder having a jet at its bottom end,
 a piston with a piston rod connected thereto disposed in the body of said pipette,
 said piston rod extending through said cylinder to said jet,
 a gripping arm in the form of a slidable sleeve movably supported within the bore of said body and adapted for gripping said piston rod by force applied to said slidable sleeve to cause said sleeve to attache itself to said piston rod by friction, a movable releasing rod provided inside of the slidable sleeve by means of which the piston rod can be separated from the slidable sleeve,
 and means located on the hand grip portion of the body for applying force to said slidable sleeve and hence to said piston rod extending through said cylinder to said jet.

2. The pipette as in claim 1, wherein a bottom limiter is provided connected to the slidable sleeve, said bottom limiter together with a first outer surface located in the body of the pipette is adapted to determine a bottom position of the slidable sleeve with regard to said body.

3. The pipette as in claim 1, wherein a top limiter is provided connected to the slidable sleeve which together with a second counter surface located int eh body of the pipette is adapted to determine a top position of the slidable sleeve with regard to said body.

4. The pipette as in claim 3, wherein the position of the second counter surface of the top limiter is adjustable in accordance with a direction of movement of said slidable sleeve.

5. The pipette as in claim 3, wherein a spring is connected to the slidable sleeve such that the spring presses the slidable sleeve towards its top position.

6. The pipette as in claim 5, including a sliding part and a movable releasing rod disposed inside the slidable sleeve, said release rod having a spring cooperatively associated therewith for holding the release rod in a predetermined top position relative tot he slidable sleeve and against the downward force of said spring, the spring associated with the release rod being more rigid than the spring associated with the slidable sleeve.

7. The pipette as in claim 3, wherein the top limiter is a nut threaded on a pressing rod provided as an extension of the slidable sleeve, the nut being prevented from rotating on said pressing rod.

8. The pipette as in claim 1, wherein a limiter is provided connected to the piston rod and a counter surface to said cylinder, whereby by applying a force to said piston rod, the cylinder is released from said tip portion of said pipette body.

9. The pipette as in claim 1, wherein holding means are provided within the body of the pipette cooperably associated with the piston to enable the piston to be maintained in the slidable sleeve, said cooperably associated holding means being elastically deformable.

* * * * *